(12) United States Patent
Seaberg et al.

(10) Patent No.: US 6,717,533 B2
(45) Date of Patent: Apr. 6, 2004

(54) METHOD AND APPARATUS FOR COMBINING A WIRELESS RECEIVER AND A NON-WIRELESS RECEIVER

(75) Inventors: Charles Eric Seaberg, Austin, TX (US); Gregory J. Buchwald, Crystal Lake, IL (US); Azfar Inayatullah, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 276 days.

(21) Appl. No.: 09/872,270

(22) Filed: May 31, 2001

(65) Prior Publication Data

US 2002/0183025 A1 Dec. 5, 2002

(51) Int. Cl.[7] .............................. H03M 7/00; H03M 1/12
(52) U.S. Cl. ........................... 341/61; 341/155; 455/323
(58) Field of Search ................... 341/61, 143; 381/119; 375/324; 370/545, 342, 320; 455/323, 260; 331/117 R, 179, 2; 725/81

(56) References Cited

U.S. PATENT DOCUMENTS

| | | |
|---|---|---|
| 5,430,890 A | 7/1995 | Vogt et al. |
| 5,647,008 A | 7/1997 | Farhangi et al. ............. 381/119 |
| 5,963,153 A | 10/1999 | Rosefield et al. ............. 341/61 |
| 6,208,671 B1 | 3/2001 | Paulos et al. ............... 370/545 |
| 6,263,503 B1 * | 7/2001 | Margulis ....................... 725/81 |
| 6,347,123 B1 | 2/2002 | Mathe et al. ................ 375/324 |
| 6,542,094 B1 | 4/2003 | Venkitachalam et al. ..... 341/61 |

\* cited by examiner

*Primary Examiner*—Patrick Wamsley
(74) *Attorney, Agent, or Firm*—James L. Clingan, Jr.; Susan C. Hill

(57) ABSTRACT

A vehicular audio system receives audio inputs from audio sources and a radio receiver. Analog audio is converted to digital, and digital audio remains natural digital. The receiver front end converts a radio signal to an intermediate frequency then an ADC converts that to a digital signal. The inputs that are converted to digital are selectively mixed with each other and with the natural digital signals. This allows for sounds from multiple sources to be heard simultaneously so that a telephone ring may be provided without requiring background music to be interrupted and for uses such as voice by microphone over a music tape. A reference frequency to the receiver front end of 7.2 MHz is particularly beneficial for noise reduction and consequent mixing of digital audio at 48 KHz, the standard frequency for typical digital audio inputs.

22 Claims, 5 Drawing Sheets

| BAND | F RANGE | LOCAL OSC (MHz) | N ÷ | Δf | RATER | K ÷ | L ÷ | FREQ INTO PHASE DETECTOR |
|---|---|---|---|---|---|---|---|---|
| US WX | 162.40–162.55 | 173.2–173.35 | 6928–6934 | 25 KHz | 25 KHz | 288 | ÷ 1 | 25 KHz |
| FM EUROPE | 87.6–107.9 | 196.8–237.4 | 7872–9496 | 12.5 KHz | 100 KHz | 288 | ÷ 2 | 25 KHz |
| FM USA | 87.7–107.9 | 197.0–237.4 | 7880–9496 | 12.5 KHz | 200 KHz | 288 | ÷ 2 | 25 KHz |
| FM JAPAN | 76–90 MHz | 195.6–237.6 | 7824–9504 | 16.667 | 100 KHz | 288 | ÷ 3 | 25 KHz |
| LW, MW, EUROPE, JAPAN, USA, WORLD | 144 KHz–1710 KHz | 196.992–225.18 | 10944–12510 | 1 KHz | 9, 10 KHz (3 KHz, 1KHz) | 400 | ÷ 18 | 18 KHz |
| AM-USA ALTERNATE | 530–1710 KHz | 203.94–225.18 | 10197–11259 | 1.111 KHz | 10 KHz | 360 | ÷ 18 | 20 KHz |
| DAB BAND 3 E-147 | 174–240 | 184.8–250.8 | 11550–15675 | 16 KHz | 16 KHz | 450 | ÷ 1 | 16 KHz |
| SW 49 M | 5.85–6.30 | 199.8–205.2 | 9990–10260 | 1.667 KHz | 5 KHz | 360 | ÷ 12 | 20 KHz |
| SW 38 M | 7.095–7.500 | 214.74–219.60 | 10737–10980 | 1.667 KHz | 5 KHz | 360 | ÷ 12 | 20 KHz |
| SW 4–10 MHz | 4–10 MHz | 177.6–249.6 | 8880–12480 | 1.667 KHz | 5 KHz | 360 | ÷ 12 | 20 KHz |
| SW 10–18 MHz | 10–18 MHz | 166.4–230.4 | 8320–11520 | 2.5 KHz | 5 KHz | 360 | ÷ 8 | 20 KHz |
| FM E. EUROPE | 65–74 | 227.4–254.4 | 7580–8480 | 10 KHz | 30 KHz | 240 | ÷ 3 | 30 KHz |

*FIG.5*

METHOD AND APPARATUS FOR COMBINING A WIRELESS RECEIVER AND A NON-WIRELESS RECEIVER

FIELD OF THE INVENTION

This invention relates to receivers and more particularly to digital receivers for use in receiving analog signals and digital signals.

BACKGROUND OF THE INVENTION

In vehicular audio systems a variety of inputs are desirably utilized in providing audio entertainment and functionality. One of the inputs is a radio frequency or other wireless input which may provide wireless inputs such as AM, FM, short wave and weather band types of channels. On the other hand, other sources of non-wireless audio are commonly cassette, CD, DVD audio and MP3. One of the challenges in providing this variety of inputs in a usable form is that they all are provided in different formats or at least they may be provided in different formats and cannot be relied upon to be in the same format. For example, the RF information such as FM and AM is provided as wireless signals. On the other hand the cassette, CD, MP3 and audio DVD are non-wireless inputs. The cassette input is an example of an analog signal. Examples of a digital input are MP3 and DVD audio. Other audio signals that may be received are microphone and navigation information. Thus the ability to provide the desired audio to the occupants of the vehicle includes finding a way to address this variety of signal types that are received or may be received. Thus there is a need to provide an efficient mechanism for providing the variety of inputs in a form to the occupants that is compatible with the desires and needs of the occupants.

BRIEF DESCRIPTION OF THE DRAWINGS

Shown in FIG. 1 is a block diagram of an audio system according to a preferred embodiment of the invention;

Shown in FIG. 2 is a detailed block diagram of a first portion of the block diagram of FIG. 1;

FIG. 5 is a table useful in understanding the audio system of FIG. 1.

DESCRIPTION OF THE INVENTION

A wireless input and a non-wireless input are effectively combined so that both may be efficiently provided as an audio output signal. This is achieved by selecting a frequency at which all the digital signals are provided to a common digital audio mixer.

Figure 1:
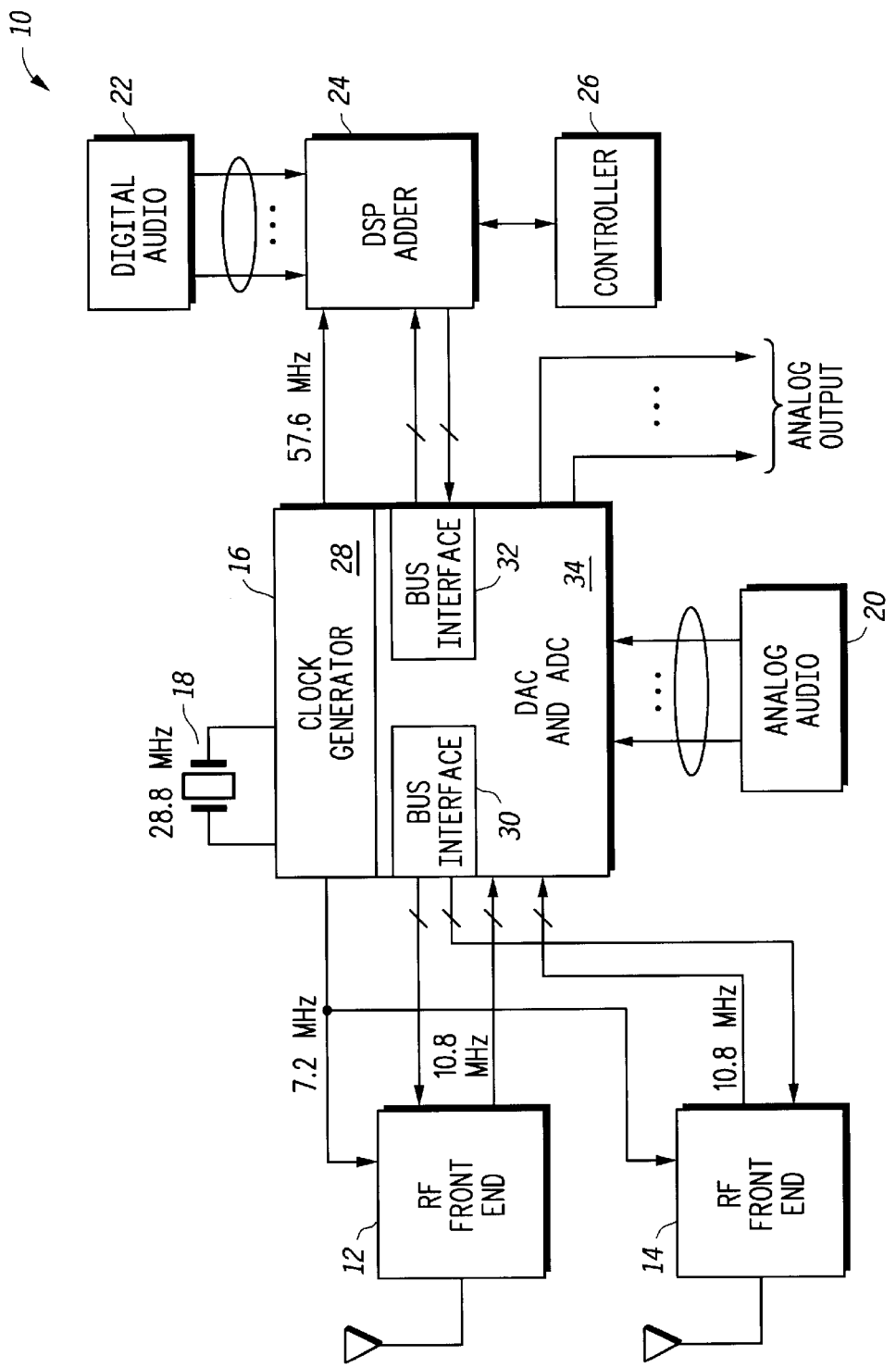

Shown in FIG. 1 is an audio system 10 comprising an RF front end 12, an RF front end 14, a converter 16, a resonator 18, an analog audio source 20, a digital audio source 22, a DSP adder 24, and a controller 26. RF front end 12 receives an RF signal which may be FM, AM, weather band, or short wave or some other wireless type signal. Similarly, RF front end 14 receives an RF signal of the same class as that received by RF front end 12. RF front end 12 and RF front end 14 each provide an intermediate frequency signal to converter 16. Analog audio source 20 provides differing analog audio signals to converter 16. Digital audio source 22 provides multiple digital signals representative of audio information to DSP adder 24. Controller 26 coupled to DSP adder 24 provides control information to the DSP adder 24, converter 16, RF front end 12, and RF front end 14. The controller information from controller 26 may be routed through DSP adder 24 or applied directly to converter 16, RF front end 12, RF front end 14, as well as DSP adder 24.

Converter 26 comprises a clock generator 28, a bus interface 30, a bus interface 32, and a digital-to-analog converter (DAC) and analog-to-digital converter (ADC) 34. In operation, resonator 18 coupled to clock generator 28, provides for a clock oscillator to operate at 28.8 megahertz (MHz). This clock frequency is then utilized to provide a RF reference to RF front end 12 and RF front end 14 at 7.2 MHz. This 28.8 MHz clock frequency is also used to provide a DSP reference to DSP adder 24 at 57.6 MHz. RF front end 12 and RF front end 14 operate in a similar fashion but may be operating on different input signals. RF front end 12 converts the received RF signal to an intermediate frequency signal utilizing a frequency derived from the RF reference of 7.2 MHz. The IF frequency is provided at 10.8 MHz. The intermediate frequency is then sampled and converted to a digital signal by DAC and ADC 34 and provided as an output by converter 16 through bus interface 32 to DSP adder 24. An input from analog audio source 20 is converted to a digital signal by DAC and ADC 34 and provided as an output to DSP adder 24 via bus interface 32. Bus interface 32 is controlled by controller 26 and multiplexes the signal received from analog audio source 20 and RF front ends 12 and 14 to DSP adder 24. Digital audio source 22 provides digital signals to DSP adder 24. DSP adder 24 combines the wireless signals received by front ends 12 and 14 as converted to digital form with signals received from analog audio source 20, and digital audio source 22 under the control of controller 26.

Typically, digital audio source 22 and analog audio source 20 are separate units of hardware that are designed for the particular type of audio information they provide such as a cassette player or an MP3 player. It has become a standard for most digital audio sources that they provide data at a rate of 48 KHz or multiples thereof. For the purpose of mixing a wireless audio signal with such a 48 KHz digital audio signal, it is a benefit for the information that is received as a wireless signal to be also at a data rate of 48 KHz. Thus, it is desirable that the clock frequency used as DSP reference for DSP adder 24 be such that 48 KHz is an integer-number multiple thereof. In this case the chosen DSP reference is 57.6 MHz. 57.6 MHz is conveniently twice that of the crystal oscillator that provides a 28.8 MHz clock frequency. Similarly, RF front ends 12 and 14 receive the RF reference at 7.2 MHz, which is conveniently one fourth of the clock frequency of 28.8 MHz.

The frequency of 7.2 MHz is carefully chosen so that it is a multiple of the raster spacing for a number of different radio tuning requirements throughout the world. The typical required raster spacings that cover the vast majority of the requirements of the world, as shown is FIG. 5, are 16, 18, 20, 25, and 30 KHz. The frequency of 7.2 MHz is a whole number multiple of each of these desirable raster spacings. RF front ends 12 and 14 perform filtering, RF mixing, and amplifying of the wireless broadcast signal to produce a wireless input signal at an intermediate frequency.

The frequency of 10.8 MHz as the IF is conveniently generated as a frequency whose alias, one fourth of the sample frequency, is equidistant from 7.2 MHZ as 10.8 MHz is. Downconverting the IF signal to base band using an alias image is well known and commonly called sub-sampling.

Thus the RF reference in this described embodiment is halfway between the intermediate frequency and its alias. This is desirable because there is essentially no interference between this reference frequency and the IF frequency and its alias. In this case the alias is created using a sampling clock at 14.4 MHz in the converter 16 making the alias 3.6 MHz. This technique of centering the reference frequency between the IF and its alias image is effective so long as the IF is sufficiently narrow in bandwidth so that it does not extend to the mid frequency point of 7.2 MHz in this case. Thus the selection of a clock frequency of 28.8 MHz is advantageously used in the RF front ends 12 and 14 to provide the wide variety of raster spacings, the IF sampling frequency, and also to provide the optimum sample frequency consistent with the industry standard for MP3 and DVD audio for digital mixing and represented as digital audio source 22 in FIG. 1.

Analog outputs from converter 16 result from conversion of digital signals provided by DSP adder 24 to converter 16. Converter 16 performs a digital-to-analog conversion and provides the analog outputs. These analog outputs are then useful for providing the desired audio outputs. These analog output signals would typically be received by a power amplifier that would in turn be connected to speakers. As an alternative, DSP adder 24 could provide digital signals directly to an active speaker system capable of converting digital signals to analog signals and driving the speakers.

A benefit of using the frequency of 7.2 MHz for the RF reference is that a type of noise called synthesizer reference spurs is generated at 18 KHz or above, which is generally considered above the audible range. This arises because the 7.2 MHz RF reference is integer divisible by 18 KHz as well as the other raster spacings. Thus, the synthesizer reference spurs occur at or above these raster spacing frequencies. If a lower frequency is required in order to achieve the lower raster spacing, then the synthesizer spurs are generated at this lower frequency and may become audible. Another benefit of not having to go to a lower frequency than the raster spacing frequency itself is faster locking in RF front end 12 or RF front end 14.

Figure 2:
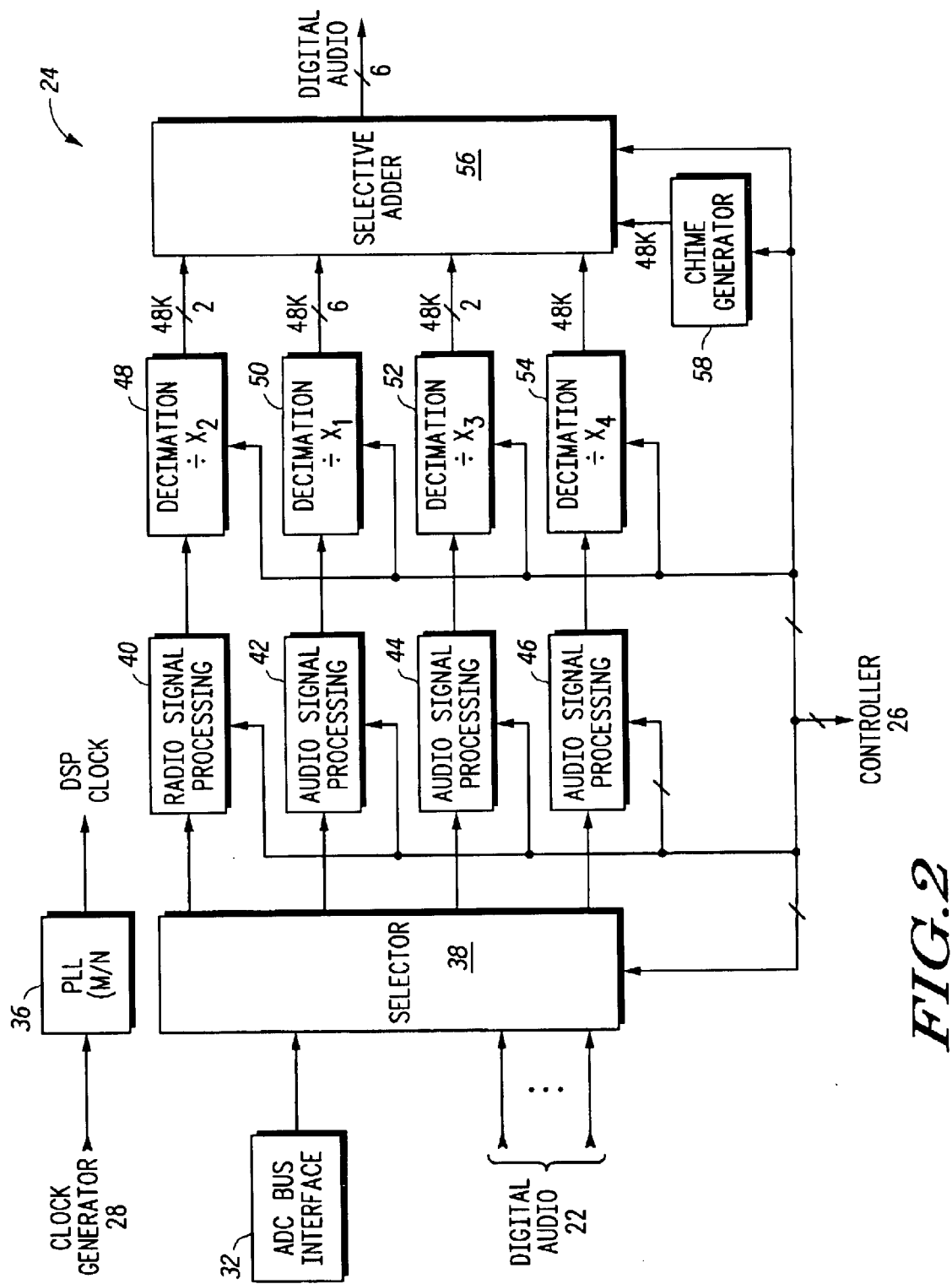

Shown in FIG. 2 is DSP adder 24 in more detail. DSP adder 24 comprises a phase lock loop 36, a source selector 38, radio signal processing block 40, audio signal processing block 42, audio signal processing block 44, audio signal processing block 46, decimator 48, decimator 50, decimator 52, decimator 54, selector adder 56, and a chime generator 58. Phase lock loop 36 provides a DSP clock derived from clock generator 28. DSP clock and controller 26 are coupled to radio signal processing 40, audio signal processing 42–46, decimators 48–54, selector adder 56, source selector 38, and chime generator 58. Source selector 38 receives digital signals from ADC bus interface 32 and selectively couples the signals to either radio signal processing 40 or one of audio signal processing blocks 42–46. Source selector 38 also receives digital audio signals from digital audio source 22 and selectively couples them to one of audio signal processing 42–46. Shown here is just one radio signal processing block 40 and three audio signal processing blocks 42–46, but there may be more of each in a different embodiment.

The signal processing by blocks 40–46 varies depending upon the particular need. For example, for blocks 42–46 in particular decompression decoding may occur. For radio signal processing block 40, radio signal demodulation and audio fidelity improvement processing are particularly relevant. For all blocks 40–46 treble, bass, and volume control may be applied. Decimators 48–54 reduce the frequency, if necessary, of the signal from signal processing blocks 40–46 by an amount to achieve the desired 48 KHz data rate. The "x" value in at least some of the decimators 50–54 can be 1. Some of the signal processing may be moved from between source selector 38 and decimators 48, 50, 52, and 58 to from between decimators 48, 50, 52, and 58 and selective adder 56. Filtering, for example, may only require a single set of coefficients for signals that are the same frequency. Thus, it may save memory to move filters between decimators 48, 50, 52, and 58 and selective adder 56.

Thus selective adder 56 receives multiple inputs derived directly from decimators 48–54 all at the same sample frequency and synchronous with each other. Thus, selective adder 56 can easily mix these signals in a normal audio context. The effect of selective adder 56 is to superimpose the content of any two or more of the incoming signals together. They can be superimposed or added in a ratio determined by controller 26. Further, chime generator 58 provides a signal at a sample rate of 48 KHz, which may also be mixed with any of the other signals provided to selective adder 56. Chime generator 58 is convenient for indicating to the occupants of a vehicle of an incoming phone call or any other type of alert. Thus music that is playing does not have to be muted in order to provide the alert.

The sampling frequencies of 48 KHz being in common is conveniently provided because only integer decimation is needed for it to be achieved. In some cases no decimation may be required. Digital audio 22 provided externally to DSP adder 24 may not be exactly 48 KHz. In such case it may be necessary to convert it to precisely 48 KHz and have it timed perfectly with the other signals. This timing is achieved using the DSP clock provided by PLL 36. This processing would typically be provided prior to source selector 38 receiving the signal. A common technique for achieving this is the use of an asynchronous sample rate converter. The synchronization may also be achieved by the decimators that provide phase adjustment as needed.

Figure 3:
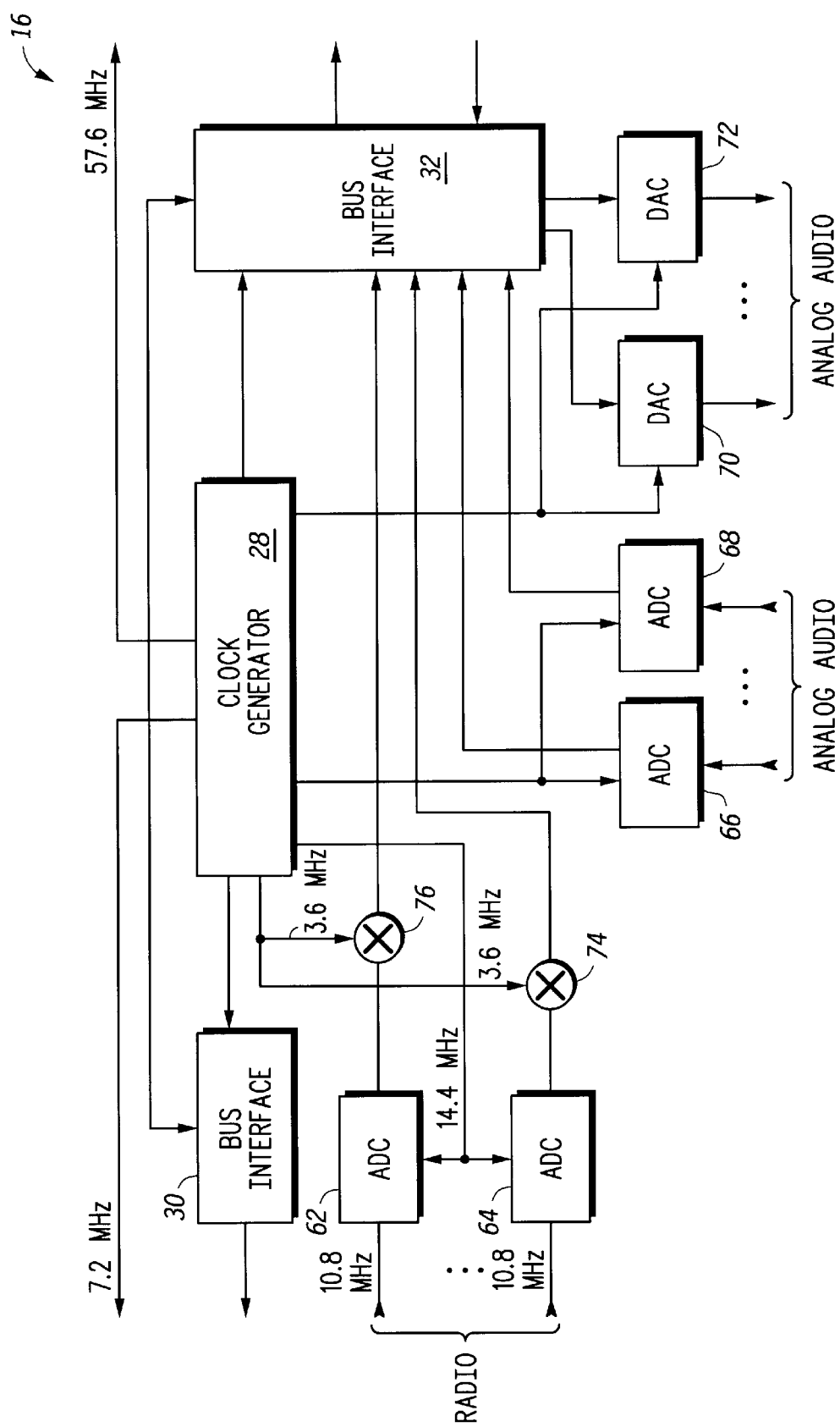
FIG. 3 is a more detailed block diagram of a second portion of the block diagram of FIG. 1.

Shown in FIG. 3 is converter 16 in more detail. Converter 16 comprises bus interface 30, an A to D converter (ADC) 62, an A to D converter 64, clock generator 28, an A to D converter 66, an A to D converter 68, a D to A converter 70, a D to A converter 72, bus interface 32, mixer 74 and mixer 76. Bus interface 30 provides microcontroller information to the RF front ends 12 and 14. Microcontroller input arrives via bus interface 32. Not all of the microcontroller connections are shown in FIG. 3. For example, the microcontroller inputs arriving at bus interface 32 are coupled to each of the elements shown in FIG. 3 such as A to D converters 62–68 and clock generator 28 as well as mixers 74 and 76. Also, microcontroller inputs are coupled to DACs 70 and 72.

A to D converters 62 and 64 receive the intermediate center frequency from RF front ends 12 and 14. There may be even additional RF front ends and corresponding A to D converters as part of converter 16. A to D converters 62 and 64 convert the intermediate center frequency to a digital signal sampled at 14.4 MHz so the A to D converters 62 and 64 are designed so that they operate on the image of the intermediate center frequency, the image in this case being 3.6 MHz. The result is a digital signal with a 3.6 center frequency. IF digital mixers 74 and 76 mix the digital IF signal with 3.6 MHz to provide the digital signal without central frequency. The center frequency is removed so it is simply a digital signal so the outputs of mixers 74 and 76 are provided to bus interface 32. Bus interface 32 multiplexes them as an output to DSP adder 24. Similarly, A to D converters 66 and 68, and there may be more than just the two shown, receive an analog signal and convert it to a digital signal. The sample rate is a multiple of 48 KHz but is typically greater than 48 KHz. The output of A to D converter 66 and 68 are coupled to bus interface 32 which multiplexes them to DSP adder 24.

The A to D converters 62–68 each thus provide a digital signal at a rate which is a multiple of 48 KHz. Bus interface 32 receives a digital signal from DSP adder 24 and couples them to one or more of D to A converters 70 and 72. Additionally, there may be more D to A converters than the two shown. The D to A converters convert the digital signal provided by DSP adder 24 and coupled by bus interface 32 to an analog signal that is in a condition to be further amplified and provided to a speaker via output the digital output of selective adder 56. Clock generator 28, as shown in FIG. 3, is coupled to resonator 18 to provide the desired 28.8 MHz frequency. This 28.8 MHz base clock frequency is thus convenient for providing the desired 7.2 MHz reference clock for the RF front ends 12 and 14, which in turn provide the 10.8 MHz intermediate center frequency. Similarly, the 28.8 MHz clock frequency provides convenience for the sample rates for the A to D converters 66 and 68 and is thus consistent with the industry standard. 48 KHz of digital sources such as MP3 and DVD audio.

Figure 4:
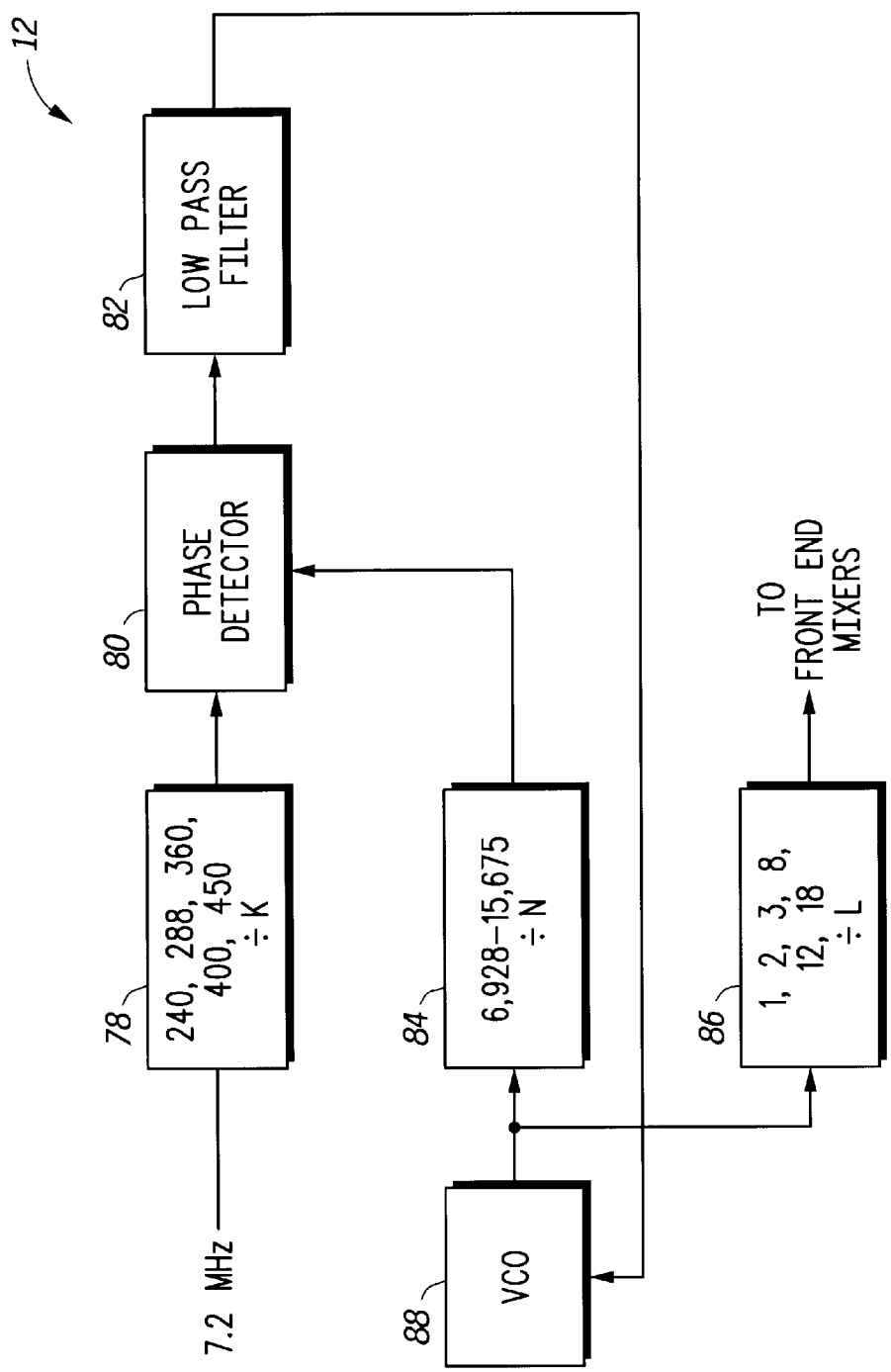
FIG. 4 is a more detailed block diagram of a third portion of the block diagram of FIG. 1.

Shown in FIG. 4 is a portion of front end 12 comprising a divider 78, a phase detector 80, a low pass filter, 82, a divider 84, a divider 86, and a VCO 88. Divider 78 divides the incoming RF reference, which is at a frequency of 7.2 MHz, by an integer selected to obtain one of 16, 18, 20, 25, and 30 KHz, depending upon the relevant raster spacing. Phase detector 80 receives the output of divider 78 and an output of divider 84, which provides the output as a signal divided from VCO 88. Phase detector 80 compares these two outputs and provides an error output if they are not in phase. Low pass filter 82 receives the output of phase detector 80 and provides a control signal to VCO 88. Eventually VCO will adjust until the frequency of the output of divider 84 is the same frequency as the output of divider 78 and phase lock is obtained. The phase lock is not perfect however so that the unintentional synthesizer reference spurs are generated at the rate of the output of the phase detector 80. The spurs are detrimental to analog signals but are not problematic in digital transmission. Further, if the band is AM, anything above 10 KHz is filtered out anyway because 10 KHz is the maximum audio frequency that is transmitted. Divider 86 is considered the output of the local oscillator and provides the output frequencies used by RF front end such as that required to produce the 10.8 MHz IF.

Shown in FIG. 5 is a table showing, by jurisdiction, bands, local oscillator frequencies, change in frequency by a change of one in n, raster frequencies, and the integer divisors applied to dividers 80, 84, and 86 of FIG. 4 to achieve the IF of 10.8 MHz. Note that in all cases the 7.2 MHz is divided by a number no greater than 400, which is 18 KHz, except for one case, and that case is digital transmission.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for combining a wireless receiver and a wired receiver, comprising the steps of:

sampling a wireless input signal at a first sample frequency as part of an analog to digital conversion to convert the wireless input signal to a digital converted wireless signal;

providing a wired input signal as a digital wired signal, the digital wired signal having a second sample frequency, wherein the first sample frequency and the second sample frequency are different;

if the first sample frequency of the digital converted wireless signal is not a predetermined frequency, rate converting the digital converted wireless signal from the first sample frequency to a predetermined sample frequency to produce a digital wireless result signal; and if the second sample frequency of the digital wired signal is not the predetermined sample frequency, rate converting the digital wired signal from the second sample frequency to the predetermined sample frequency to produce a digital wired result signal.

2. A method as in claim 1, further comprising the step of:

adding the digital wireless result signal and the digital wired result signal to produce an output signal.

3. A method as in claim 2, further comprising the step of:

providing the output signal as an audio signal in which content of the wireless input signal and content of the wired input signal are superimposed on one another in the audio signal.

4. A method as in claim 3, wherein said step of providing the output signal as an audio signal comprises the step of:

filtering the output signal using only one set of filter coefficients, wherein only one set of filter coefficients is required since the digital wireless result signal and digital wired result signal both have the predetermined sample frequency.

5. A method as in claim 2, further comprising the step of:

weighting at least one of the digital wireless result signal and the digital wired result signal before performing said step of adding.

6. A method as in claim 1, wherein said step of providing a wired input signal as a digital wired signal comprises the step of:

sampling the wired input signal at the second sample frequency as part of a second analog to digital conversion to convert the wired input signal to the digital wired signal.

7. A method as in claim 1, further comprising the steps of:

receiving a wireless broadcast signal at an input of the wireless receiver; and filtering, mixing, and amplifying the wireless broadcast signal to produce the wireless input signal.

8. A method as in claim 1, wherein the predetermined sample frequency is an integer-number multiple of 48 KHz.

9. A method as in claim 1, wherein the predetermined sample frequency is 48 KHz.

10. A method as in claim 1, wherein the wireless receiver is a radio receiver.

11. A method as in claim 1, wherein the wired input signal is received from at least one of a CD player, a Dolby player, a MP3 player, a cassette player, and a microphone.

12. A portion of a receiver for simultaneously processing data received in a wireless manner and data received in a non-wireless manner, the portion of the receiver comprising:
- a wireless front end which receives a reference frequency, the wireless front end uses a derivative of the reference frequency to mix an incoming wireless broadcast signal to a predetermined intermediate frequency to produce a wireless input signal, wherein mixing the wireless broadcast signal to the predetermined intermediate center frequency does not produce any reference spurs in the wireless input signal that are within the audio range of human hearing;
- an analog to digital converter using an A/D sample frequency to convert the wireless input signal to a digital converted wireless signal;
- rate converter for rate converting the digital converted wireless signal from the A/D sample frequency to a predetermined sample frequency to produce a digital wireless result signal; and
- circuitry for receiving a wired input signal, said circuitry selectively processing the wired input signal to produce a digital wired result signal, so that the digital wired result signal is digital and has the predetermined sample rate.

13. A portion of a receiver as in claim 12, wherein said circuitry for receiving a wired input signal further comprises a second analog to digital converter having a second A/D sample frequency.

14. A portion of a receiver as in claim 13, wherein the reference frequency, the A/D sample frequency, the second A/D sample frequency, and the predetermined sample frequency are integer-number dividers from a single crystal oscillator frequency.

15. A portion of a receiver as in claim 12, further comprising a selective adder for selectively adding the digital wireless result signal and the digital wired result signal.

16. A portion of a receiver as in claim 12, wherein said rate converter comprises a decimator.

17. A portion of a receiver as in claim 12, wherein said circuitry for receiving a wired input signal comprises a second rate converter.

18. A portion of a receiver as in claim 12, wherein the predetermined sample frequency is an integer-number multiple of 48 KHz.

19. A portion of a receiver as in claim 12, wherein the reference frequency, the A/D sample frequency, and the predetermined sample frequency are integer-number multiples of 48 KHz.

20. A portion of a receiver as in claim 12, further wherein intermediate center frequency is 10.8 MHz, the reference frequency is 7.2 MHz, the A/D sample frequency is 14.4 MHz, the predetermined sample frequency is 48 KHz, and the reference frequency, the A/D sample frequency, and the predetermined sample frequency are integer-number dividers from a single crystal oscillator frequency.

21. A portion of a receiver as in claim 12, wherein the reference frequency is integer multiples of the frequency presented to the phase detector selected from multiples of 16, 20, 25, and 30 KHz.

22. A portion of a receiver for simultaneously processing data received in a wireless manner and data received in a non-wireless manner, the portion of the receiver comprising:
- an analog to digital converter using an A/D sample frequency to convert a wireless input signal to a digital converted wireless signal;
- rate converter for rate converting the digital converted wireless signal from the A/D sample frequency to a predetermined sample frequency to produce a digital wireless result signal; and
- circuitry for receiving a wired input signal, said circuitry selectively processing the wired input signal to produce a digital wired result signal, so that the digital wired result signal is digital and has the predetermined sample rate; and
- a selective adder for selectively adding the digital wireless result signal and the digital wired result signal.

* * * * *